United States Patent

[11] 3,588,154

| [72] | Inventors | Robert W. Voight;<br>Robert G. Moore, Jr., both of South Bend, Ind. |
|---|---|---|
| [21] | Appl. No. | 773,367 |
| [22] | Filed | Oct. 29, 1968 |
| [45] | Patented | June 28, 1971 |
| [73] | Assignee | The Bendix Corporation |

[54] TORQUE COUPLING DEVICE
9 Claims, 3 Drawing Figs.

[52] U.S. Cl................................................. 287/108, 64/14
[51] Int. Cl................................................. F16d 1/00
[50] Field of Search................................... 287/108, 53 (Splined), 126; 74/490; 64/27 (R), 14

[56] References Cited
UNITED STATES PATENTS
| 502,686 | 8/1893 | Tilton.......................... | 287/108 |
| 1,469,304 | 10/1923 | Hughes....................... | 287/108 |
| 2,704,681 | 3/1955 | Fischer....................... | 287/126 |
| 2,781,436 | 2/1957 | Barden........................ | 74/490UX |
| 2,800,800 | 7/1957 | Dunn........................... | 74/490X |
| 3,320,771 | 5/1967 | Roethlisberger et al..... | 64/27R |

Primary Examiner—Williamowsky
Assistant Examiner—Andrew V. Kundrat
Attorneys—C. F. Arens and Pante, Arens, Hartz, Hix & Smith ABSTRACT: The present invention relates to a torque coupling device for transmitting rotary motion comprising a sleeve member having internal splines therein and an annular groove adjacent each end, and which grooves contain resilient C-ring elements capable of cold-flowing into radial holes spaced around the periphery of each groove.

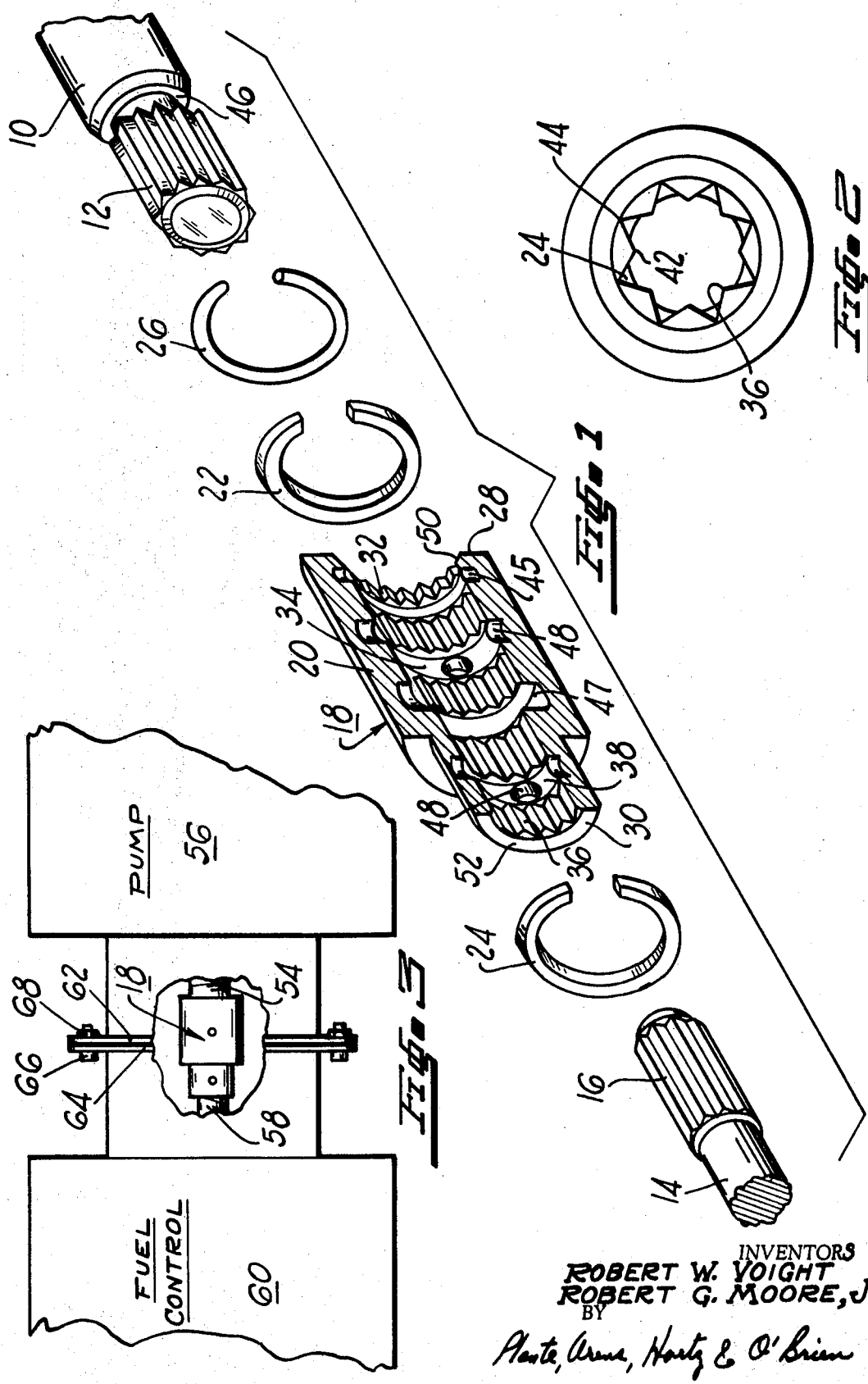

TORQUE COUPLING DEVICE

BACKGROUND OF THE INVENTION

The invention concerns an improvement to torque coupling devices of the variety generally used for transmitting bidirectional rotary motion between aligned shafts. More specifically, the invention may be used in association with combustion engine fuel control systems for coupling the engine driven fuel pump to the fuel control system. However, it is felt that the invention may be used for any application where it is required that rotational movement be transmitted between aligned shafts.

The conventional torque coupling devices with which I am familiar consist mainly of structure and techniques including sleeves and bushings having set screws or pins for engaging the shafts, and bellows or spring means disposed between the shafts. One or more of the above or combinations are operably coordinated to effect an antibacklash between two axially aligned shafts. The usual result is a bulky mechanism which is only marginally satisfactory at best for its intended operation.

SUMMARY OF THE INVENTION

It is an object of this invention to provide a torque coupling device that minimizes to an extent heretofore unattainable, the backlash and other unexplainable mechanical disturbances that develop as a result of one shaft being rotatably driven by an axially aligned shaft through a coupling device.

It is another object of the invention to provide a torque coupling device that facilitates damping of the torque coupling in a normally inaccessible environment.

It is another object of this invention to provide a torque coupling device that does not disturb the natural mechanical frequencies associated with the driver and driven elements.

It is still another object of this invention to provide a torque coupling device that minimizes the noise resulting from the coupling.

Further objects, features and advantages of the invention will be apparent from the following description of the torque coupling device taken in connection with the accompanying drawings.

BRIEF DESCRIPTION OF THE DRAWINGS

FIG. 1 is an exploded perspective view of the axially aligned serrated shafts as they cooperate with the torque coupling device, partially sectioned, to transmit rotation therebetween;

FIG. 2 is an end view of the torque coupling device as seen looking into the perspective view of FIG. 1; and FIG. 3 is a side elevation view of a pump and fuel control assembly, partially sectioned, to expose the operable connection therebetween by the torque coupling device.

DESCRIPTION OF THE PREFERRED EMBODIMENT

FIG. 1 illustrates a driver shaft 10 having a serrated end 12 and a driven shaft 14 having a serrated end 16 which are to be coupled together by the torque coupling device 18 of this invention. The torque coupling device 18 is comprised of a body 20, a first annular resilient means 22, a second annular resilient means 24, and a C-ring 26.

The body 20 has a first end 28 and a second end 30. The body 20 has extending axially inward from the first end 28 a first serrated bore 32 for receiving said driver shaft 10 with serrated end 12. The body 20 further has inward from first end 28 a first annular groove 34 extending radially outward from the serrated bore 32. The first annular groove 34 is suitably adapted to receive the first annular resilient means 22 so as to facilitate frictional engagement between said first resilient means 22 and said serrated end 12 of the driver shaft 10. The body 20 has extending axially inward from the second end 30 a second serrated bore 36 for receiving serrated end 16 of the driver shaft 14. The body 20 further has, inward from second end 30 of a second annular groove 38 which extends radially outward from the second serrated bore 36. The second annular groove 38 is suitably adapted for receiving the second annular resilient means 24 which when installed frictionally engages serrated end 16 of driven shaft 14.

Referring briefly to FIG. 2, it can be seen that the second annular resilient means 24 falls intermediate the crest 42 and the root 44 of the second serrated bore 36. Of course, the same is true of the first annular resilient means 22 with respect to the first serrated bore 32. As may be seen, the internal diameter of the annular resilient means 24 may be decreased so as to move its inner periphery closer to crest 42 to acquire additional frictional engagement between said resilient means and serrated means 12 of the driver shaft 10. It is also noted that the width and depth of the annular resilient means may be predetermined to optimize the frictional engagement between the serrated ends and their respective serrated bores. Teflon, nylon, or other similar materials may be used for construction of the resilient means.

The body 20 further includes intermediate the first end 28 and the first annular groove 34 a third annular groove 45 for receiving the C-ring 26. The C-ring 26 cooperates with annular groove 46 near the end of shaft 10 to retain and limit the axial movement of the torque coupling device 18 with respect to driver shaft 10.

The fourth annular groove 47 intermediate bores 32 and 36 of the body 20 may be provided to assist in machining of the bores 32 and 36 as well as give axial clearance for the ends of shafts 10 and 14.

The first and second annular grooves 34 and 38 may include radially extending holes 48 which are provided to cooperate with the Teflon resilient means 22 and 24 respectively to preclude rotation between the resilient means and the annular grooves. Once the Teflon resilient means are installed in their respective annular grooves the Teflon tends to cold-flow into the four holes equally spaced around the periphery of each of the annular grooves. This cold-flow action tends to serve as an anchor point at each of the holes to substantially prevent rotational movement of the resilient means as torque is being transmitted from the driver shaft pin to the driven shaft 14.

The body 20 may further include first and second annular chamfered surfaces 50 and 52 respectively to facilitate smooth insertions of the shafts into their respective bores.

Referring now to FIG. 3 the torque coupling device 18 is shown operatively engaging shaft 54 of a pump 56 for transmitting rotational movement thereof to shaft 58 of a fuel control system 60. The pump 56 has a flange 62 which engages flange 64 of the fuel control 60 so as to completely enclose the torque coupling device 18. Flanges 62 and 64 may be suitably secured by bolts 66 and nuts 68 around their respective peripheries. As may be seen from FIG. 3, the torque coupling device 18 readily lends itself, because of its design, to environments that do not provide for any adjustability once the initial installation has been made.

MODE OF OPERATION OF THE PREFERRED EMBODIMENT

Assuming that the first and second annular resilient means 22 and 24 have been properly installed in their respective first and second annular grooves 34 and 38, and that C-ring 26 has been suitably installed in its annular groove 45; the torque coupling device 18 is ready for installation in an operational environment. Installation is accomplished by axially sliding the first serrated bore 32 over the serrated end 12 of shaft 10 until C-ring 26 frictionally engages annular groove 45. Serrated end 16 of the driven shaft 14 is then axially aligned with and inserted into the second serrated bore 36 until the end of shaft 14 approaches the innermost portion of serrated bore 36. The axial penetration of shafts 10 and 14 into their respective bores 32 and 36 is not critical as long as their respective ends do not frictionally engage one another and complete engagement with the first and second annular resilient means 22 and 24 has been accomplished.

As rotation is imparted by the driver shaft 10 to the first serrated bore 32, the body 20, the second serrated bore 36, and ultimately, to the driven shaft 14, the first and second resilient means 22 and 24 substantially eliminate backlash and other unexplainable mechanical disturbances that generally result from one shaft being rotatively driven by an axially aligned shaft through the intermediary of a coupling device. Specifically, the Teflon resilient means 22 and 24 compensate for the tolerance variations between the serrated shafts and their respective bores thereby giving a smoother transmission of rotational torque from the driver shaft to the driven shaft.

While the specific details have been herein shown and described, the invention is not confined thereto, as other substitutions can be made within the spirit and scope of the invention.

We claim:

1. A torque coupling device for use with two aligned shafts having serrated ends comprising:

a body having a first and second end;

said body having inward from said first end, a first serrated bore for receiving one of said aligned shafts;

said body having inward from said first end, a first annular groove extending radially outward from said first serrated bore;

said first annular groove having disposed therein a first annular resilient means having an interference fit with the serrated end of said one of said aligned shafts and capable of cold flow such that said first resilient means is radially extruded to accommodate the serrated end of said one of said aligned shafts;

said body having inward from said second end, a second serrated bore for receiving the other of said aligned shafts;

said body having inward from said second end, a second annular groove extending radially outward from said second serrated bore;

said second annular groove having disposed therein a second annular resilient means having an interference fit with the serrated end of said other of said aligned shafts and capable of cold flow such that said second resilient means is radially extruded to accommodate the serrated end of said other aligned shaft.

2. A torque coupling device as recited in claim 1, wherein said body includes intermediate said first end and said first annular groove a third annular groove for receiving a C-ring which cooperates with an annular groove in said one of said aligned shafts to limit axial movement of said body with respect to said one of said shafts.

3. A torque coupling device as recited in claim 1 wherein said body is provided with an annular groove concentric with said first and second serrated bores and axially separating the same.

4. A torque coupling device as recited in claim 1, wherein said first and second annular grooves include holes which extend radially through said body into which said annular resilient means partially moves to thereby preclude rotation between said first and second annular resilient means and said first and second annular grooves.

5. First and second annular grooves as recited in claim 4, wherein each of said annular grooves has a plurality of openings around its periphery.

6. A torque coupling device as recited in claim 1, wherein said first and second annular resilient means are Teflon.

7. A torque coupling device as recited in claim 1, wherein said first and second annular resilient means are substantially C-shaped.

8. A torque coupling device as recited in claim 1, wherein said first and second annular grooves have predetermined axial widths and radial depths.

9. A torque coupling device as recited in claim 1, wherein said first and second annular resilient means, installed respectively, in said first and second annular grooves, project radially inward intermediate a radially innermost portion and a radially outermost portion of said first and second serrated bores.